(12) United States Patent
McClellan

(10) Patent No.: US 6,862,033 B2
(45) Date of Patent: Mar. 1, 2005

(54) DISC MEDIA MARKING

(75) Inventor: Paul J McClellan, Bend, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 62 days.

(21) Appl. No.: 10/367,466

(22) Filed: Feb. 14, 2003

(65) Prior Publication Data

US 2004/0160510 A1 Aug. 19, 2004

(51) Int. Cl.$^7$ .............................................. B41J 2/435
(52) U.S. Cl. ...................................... 347/224; 347/171
(58) Field of Search .............................. 347/224–225, 347/233, 171

(56) References Cited

U.S. PATENT DOCUMENTS

| | | |
|---|---|---|
| 4,027,217 A | 5/1977 | Harman |
| 4,967,286 A | 10/1990 | Nomula et al. |
| 5,182,741 A | 1/1993 | Maeda et al. |
| 5,398,231 A | 3/1995 | Shin et al. |
| 5,498,509 A | 3/1996 | Shin et al. |
| 5,608,717 A | 3/1997 | Ito et al. |
| 5,608,718 A | 3/1997 | Schiewe |
| 5,627,895 A | 5/1997 | Owaki |
| 5,675,570 A | 10/1997 | Ohira et al. |
| 5,688,173 A | 11/1997 | Kitahara et al. |
| 5,729,533 A | 3/1998 | Marquardt |
| 5,745,457 A | 4/1998 | Hayashi et al. |
| 5,748,607 A | 5/1998 | Ohira et al. |
| 5,751,671 A | 5/1998 | Koike et al. |
| 5,764,430 A | 6/1998 | Ottesen et al. |
| 5,766,495 A | 6/1998 | Parette |
| 5,781,221 A | 7/1998 | Wen et al. |
| 5,846,131 A | 12/1998 | Kitahara |
| 5,875,156 A | 2/1999 | Ito et al. |
| 5,915,858 A | 6/1999 | Wen |
| 5,949,752 A | 9/1999 | Glynn et al. |
| 5,958,651 A | 9/1999 | Van Hoof et al. |
| 5,967,676 A | 10/1999 | Cutler et al. |
| 5,997,976 A | 12/1999 | Mueller et al. |
| 6,019,151 A | 2/2000 | Wen et al. |
| 6,026,066 A | 2/2000 | Maezawa |
| 6,034,930 A | 3/2000 | Kitahara |
| 6,074,031 A | 6/2000 | Kahle |
| 6,102,800 A | 8/2000 | Kitahara et al. |
| 6,104,677 A | 8/2000 | Kirihara et al. |
| 6,124,011 A | 9/2000 | Kern |
| 6,160,789 A | 12/2000 | Abraham |
| 6,202,550 B1 | 3/2001 | Lee et al. |
| 6,264,295 B1 | 7/2001 | Bradshaw et al. |
| 6,270,176 B1 | 8/2001 | Kahle |
| 6,295,261 B1 | 9/2001 | Kim |
| 6,317,399 B1 | 11/2001 | Ohtani et al. |
| 6,384,929 B1 | 5/2002 | Miller |
| 6,386,667 B1 | 5/2002 | Cariffe |
| 6,403,191 B1 | 6/2002 | Casagrande |
| 6,440,248 B1 | 8/2002 | Mueller |
| 6,452,883 B2 | 9/2002 | Chan |
| 6,469,969 B2 | 10/2002 | Carson et al. |
| 2002/0191517 A1 | 12/2002 | Honda et al. |

*Primary Examiner*—Huan Tran (57) ABSTRACT

In an implementation of disc media marking, a laser renders an image on a disc media as laser marks written in concentric circular tracks. A print control application determines a radius of a first circular track such that a circumferential length of the first circular track corresponds to an integral number of laser mark spaces. The print control application further determines a radial increment from the first circular track to a second circular track such that a circumferential length of the second circular track corresponds to a second integral number of the laser mark spaces.

36 Claims, 6 Drawing Sheets

DISC MEDIA MARKING

TECHNICAL FIELD

This invention relates to marking a disc media and, in particular, to labeling an optical disc.

BACKGROUND

An optical disc, such as a compact disc (CD), is an optical data storage medium that data can be written to and read using a low-powered laser beam. Optical disc technology first appeared in the marketplace with the CD, which is typically used for electronically recording, storing, and playing back audio, video, text, and other information in digital form. A digital versatile disc (DVD) is another more recent type of optical disc that is generally used for storing and playing back movies because of its ability to store much more data in the same amount of physical space as a CD.

Compact discs were initially a read-only storage medium that stored digital data as a pattern of depressions and flat areas impressed into a piece of clear polycarbonate plastic through a complex manufacturing process. However, average consumers can now write data onto their own CDs with CD players capable of writing digital data onto CD-Rs (CD-recordable discs), CD-RWs (CD-rewritable discs), and the many other forms of optical discs.

Methods for labeling the non-data side of such optical discs with text and images, for example, have continued to develop as consumers desire more convenient ways to identify their own recorded discs. Basic methods for labeling a disc include physically writing on the non-data side with a permanent marker (e.g., a Sharpie marker), or printing out a paper sticker label and sticking it onto the non-data side of the disc. Other physical marking methods developed for implementation in conventional optical disc players include ink jet printing, thermal wax transfer, and thermal dye transfer methods. Still other methods use the laser in a conventional disc player to mark a specially prepared disc surface.

A label image can be rendered on the label surface (i.e., the non-data side, or top side) of an optical disc by marking the label surface with a laser beam along concentric circular tracks around the disc. When an optical disc is labeled on concentric circular tracks, however, unmarked spaces (e.g., a white space) between the start and the end of the tracks may appear as a light colored radial stripe within a label image. A space between the start and the end of a track is typically a fraction of a marking space and is therefore not marked with the laser because an entire mark will not fit into the fractional marking space. These unmarked fractional spaces are commonly referred to as end-of-track gaps and are visually objectionable.

Alternatively, if the unmarked fractional spaces at the end of the circular tracks are marked, or written over, a dark colored radial stripe may appear within light or mid-tone regions of a label image which is also visually objectionable. The dark stripe will appear because a mark that is written into a fractional marking space will overlap the first mark of the track (or the last mark of the track, or both) and the overlapped fraction of the first mark may appear darker than the other marks. Overlapping marks are commonly referred to as end-of-track overwrites.

Figure 1:
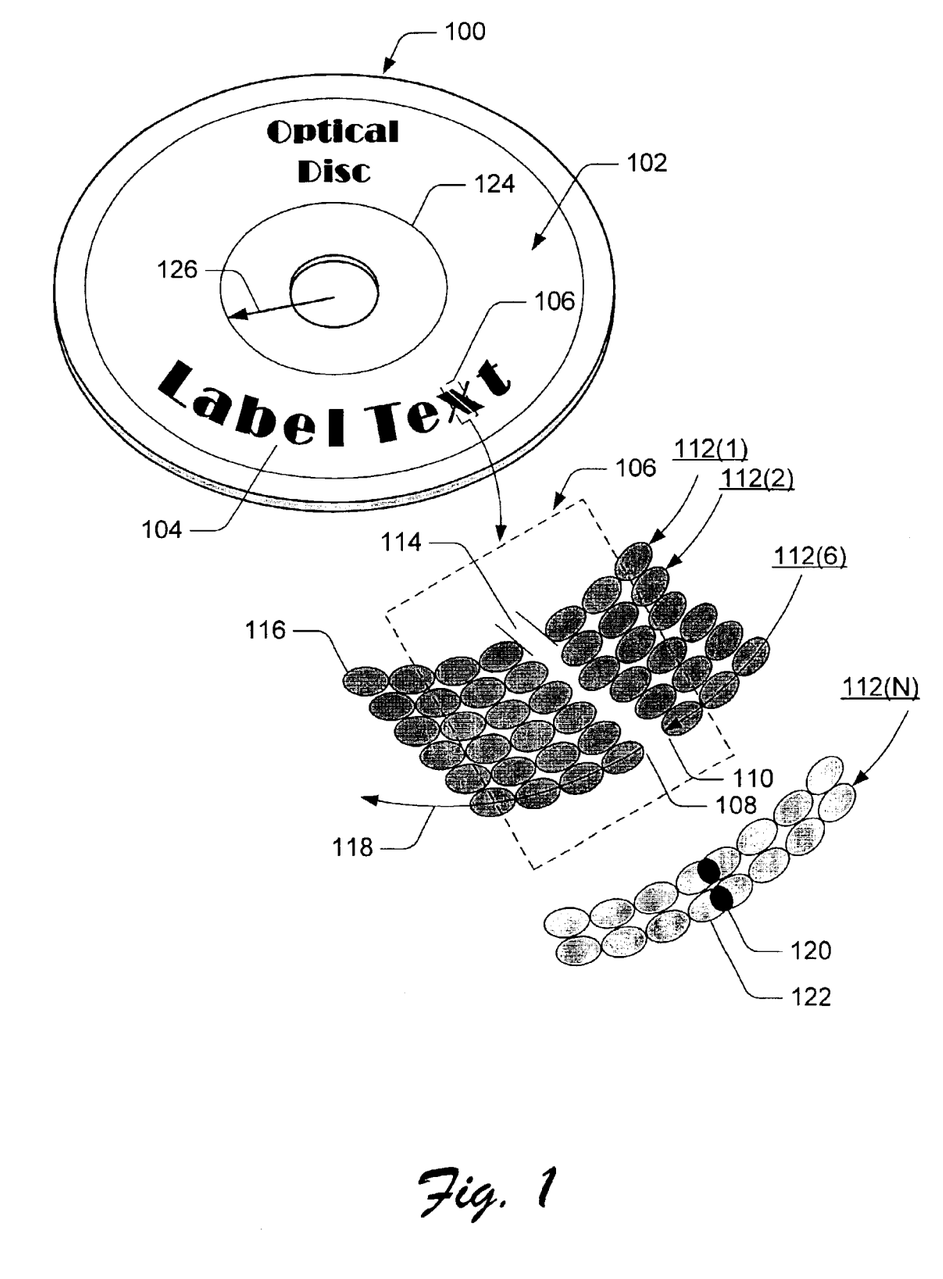
FIG. 1 illustrates end-of-track marking space gaps and overwrite problems typical of conventional concentric circular optical disc labeling techniques.

FIG. 1 illustrates the end-of-track gaps and overwrite problems associated with labeling, or marking, an optical disc 100. The disc 100 includes a disc label region 102 and a text label 104 that has been written on the disc 100 in the label region 102. A region 106 of the text label 104 is expanded to illustrate that unmarked spaces between the start 108 and the end 110 of tracks 112 will appear as a light colored radial stripe 114 within a label image, such as within the letter "x" of the text label 104. The unmarked fractional spaces between the start 108 and the end 110 of the tracks 112 vary as a fraction of a marking space in this example.

The tracks 112 in the expanded region 106 includes multiple laser marks 116 which are written onto disc 100 with a laser to form the expanded region 106 of the letter "x". The marks 116 are written to form the tracks 112 which are concentric circular tracks around the disc 100 in a direction indicated by arrow 118 (i.e., each concentric circular track 112 starts at the position 108 and ends approximately at the position 110). The tracks 112 may also be written in an opposite direction to that which is indicated by arrow 118 by some conventional labeling systems. A track 112(N) illustrates an end-of-track overwrite where a laser mark 120, written at the end of track 112(N), overlaps a first laser mark 122 creating a darker image than is desired when writing the image on the disc 100.

A gap 114 between laser marks generally occurs at the end of a track because the track length (e.g., the circumference of the track) is not an integer number of mark spaces in length. For example, the space 114 is approximately a one-half fraction of a mark 116 as shown in FIG. 1. The track lengths are not integral multiples of the mark spacing because the radius of an inner track 124 is typically selected to match a nominal print region inner radius 126. Since the circumference of this inner track 124 is a product of two-pi and the radius 126 (i.e., C=2π·R), the circumference of the track 124 will generally not be an exact integer multiple of the mark spacing.

Further, the spacing between the concentric circular tracks 112 in a radial direction 126 is typically selected as a simple ratio of the mark spacing when writing a label image onto an optical disc. For example, if the shape of the marks created with the laser are circular, selecting a track spacing that is equivalent to the mark spacing will result in a uniform print density both radially and tangentially. If the shape of the marks are ellipsoidal, the track to mark spacing ratio can be adjusted to achieve a uniform print density of the label image. However, when simply selecting a first track radius 126 that corresponds to an inner track 124 of the label region 102, and/or when selecting a track spacing to account for a uniform print density only, end-of-track gaps 114 and/or overwrites will appear in the label image because the track lengths will not be integral multiples of the mark spacing.

Accordingly, a technique is needed to visually enhance disc media marking, such as optical disc labeling, and to avoid end-of-track gaps and/or overwrites of laser marks.

SUMMARY

Disc media marking is described herein.

In an implementation, a laser renders an image on a disc media as laser marks written in concentric circular tracks. A print control application determines a radius of a first circular track such that a circumferential length of the first circular track corresponds to an integral number of laser mark spaces. The print control application further determines a radial increment from the first circular track to a second circular track such that a circumferential length of the second circular track corresponds to a second integral number of the laser mark spaces.

BRIEF DESCRIPTION OF THE DRAWINGS

The same numbers are used throughout the drawings to reference like features and components.

DETAILED DESCRIPTION

The following describes disc media marking systems and methods that visually enhance optical disc labeling and avoid end-of-track marking gaps and/or overwrites of laser marks. A user of an optical disc labeling system can create, or otherwise record, a disc of music, pictures, a backup of business files, or any other type of digital data, and then print or mark a label on the non-data side of the disc to identify the contents recorded on the disc. In the exemplary implementations described herein, the label is an image that can be any form of text, graphic, or combination thereof that is rendered on the disc with a laser. Although disc media marking is described in the context of optical disc labeling, the inventive techniques described herein are applicable to any form of marking concentric circular tracks on a surface of any type of disc media.

In one implementation of the disc media marking techniques, a radius of a first circular track in a label region on a disc media is determined. The radius is determined such that a circumference of the first track (e.g., the circumferential length of the track) corresponds to an integral number of laser mark spaces as established by the length of a laser mark space in the first track. A track spacing for the subsequent concentric circular tracks in the label region of the disc media is then determined such that the circumferential length of each of the subsequent tracks also corresponds to an integral number of the laser mark spaces. The track spacing is a radial increment from one concentric circular track to the next in the label region of the disc media. This disc media marking technique renders a label image as laser marks on the disc media and avoids end-of-track marking gaps and/or overwrites to visually enhance the appearance of the label.

Figure 2:
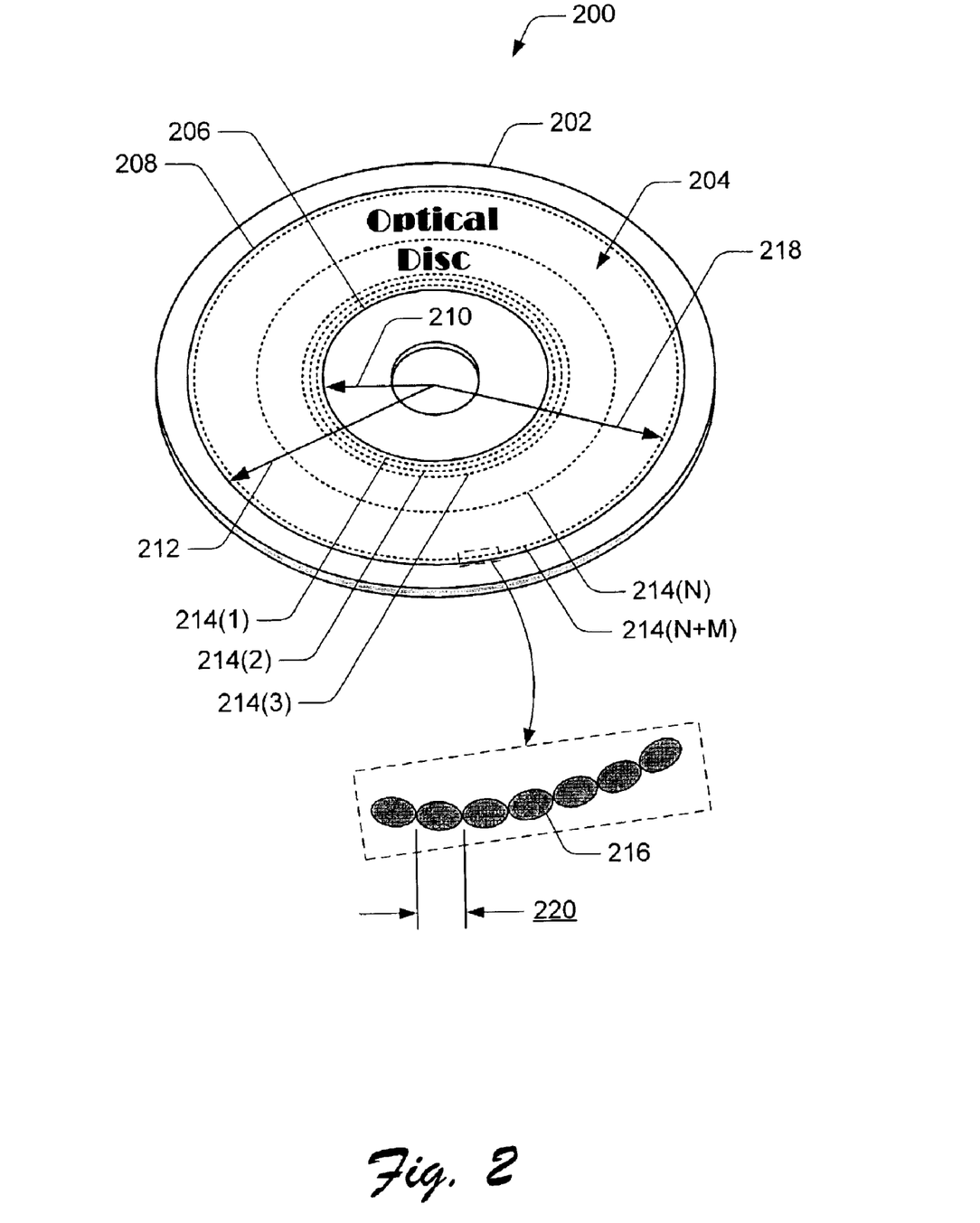
FIG. 2 illustrates an exemplary implementation of disc media marking.

FIG. 2 illustrates an exemplary implementation of disc media marking 200 to avoid end-of-track gaps and/or overwrites of laser marks when rendering a label image on a disc media 202. The disc media 202 can be any type of optical disc such as any one of a compact disc (CD), CD-R (recordable), CD-RW (rewriteable), CD-Audio, Video CD, digital versatile disc (DVD), DVD+RW (rewriteable), or any other type of optical disc to include a CD-ROM (CD-read only memory) that can be custom labeled by a consumer wanting to identify contents recorded on the disc media.

Disc media 202 includes a label region 204 defined by an inner region boundary 206 and an outer region boundary 208. A circumference of the inner region boundary 206 is defined by a radius 210 (i.e., $C=2\pi \cdot R$), and a circumference of the outer region boundary 208 is defined by a radius 212. Within the label region 204, disc media 202 includes concentric circular tracks 214(1), 214(2), . . . , 214(N), . . . , 214(N+M). The tracks 214 are written on the disc 202 as discrete laser marks 216 that are each generated when a laser is fired to render a label image within the label region 204 on the disc 202. The concentric circular tracks 214 can be written on the disc media 202 in directions that are clockwise and/or counter-clockwise. Further, the concentric circular tracks can be written on the disc media 202 starting from an inner track and moving progressively outward to an outer-most track 214(N+M), or starting from an outer track and moving progressively inward to an inner-most track 214(1).

While the laser marks 216 may be circular in shape, they are illustrated in this example as elliptical marks because, typically, when the laser fires to create a mark on the disc media 202, the disc is also spinning. Thus, the marks 216 are elongated along a track 214. For example, a laser mark 216 may be twenty-five (25) microns in a radial direction 218 and may be forty (40) microns along a track 214. A uniform print density of a label image may then be established as six-hundred (600) marks per inch along a track 214 and one-thousand (1000) tracks per inch radially (e.g., 600/1000≈25/40).

In this example, the spacing between the tracks 214 is exaggerated to illustrate that a laser is incremented by one track width in a radial direction 218 at the end of each cycle of rotation around the disc media 202. The first inner track 214(1) of label image marks can be written as the inner region boundary 206 where a radius ($R_1$) of the first inner track 214(1) is equal to the radius 210 of the inner region boundary. Additionally, the outer track 214(N+M) of label image marks can be written as the outer region boundary 208 where a radius ($R_{n+m}$) of the outer track 214(N+M) is equal to the radius 212 of the outer region boundary. In this example, the radius ($R_1$) of the first inner track 214(1) is not less than radius 210 and the radius ($R_{n+m}$) of the outer track 214(N+M) is not more than radius 212.

In this implementation of disc media marking 200, a radius ($R_1$) of the first track 214(1) is determined such that a circumference ($C_1$) of the first track 214(1) (i.e., the circumferential length of the track) is an integral number of marks 216 (or mark spaces) that are rendered on the disc media 202 in the first track. A track spacing for the subsequent concentric circular tracks 214(2), 214(3), . . . , 214(N), . . . , 214(N+M) is then determined such that the circumference ($C_n$) of each of the subsequent tracks is also an integral number of marks, or mark spaces, in a respective track. A mark space 220 in a particular track 214 may or may not include a mark 216 depending upon the label image, such as whether the particular section of the label image is light or dark in color. However, the mark spacing 220 in a track will establish the integer number of the marks that correspond to the length, or circumference, of the track. In this example, the mark lengths (e.g., the size of a mark 216 along a track 214) are equal to the mark spacing (e.g., the distance 220 along a track 214 between the centers of mark locations). However, the mark spacings can be designated less than the length of the marks such that the marks somewhat overlap in darker regions of a label image, thereby improving the optical density of those regions of the label.

Although the first track radius ($R_1$) is determined for the inner-most track 214(1) in label region 204 in this example, a radius of the outer-most track 214(N+M) could be determined as the first track radius. Additionally, the subsequent track spacing could be determined in a radial direction from the outer track 214(N+M) to the inner-most track 214(1) rather than in the radial direction 218 from the inner track to the outer-most track.

The print region 204 of disc media 202 is defined by the inner radial limit (IR) 210 and the outer radial limit (OR) 212 where the inner radial limit is less than the outer radial limit (IR<OR). The inner radial limit (IR) 210 defines an inner circumference (IC) where IC=2π·R. The inner circumference (IC) is the inner region boundary 206 of the label region 204. The outer radial limit (OR) 212 defines an outer circumference (OC) where OC=2π·OR. The outer circumference (OC) is the outer region boundary 208 of the label region 204.

A first track radius ($R_1$) (in radial direction 218) that defines a first circumference ($C_1$) of the first inner track 214(1) is the smallest track radius not less than the inner radial limit (IR) 210 such that the first track circumference $C_1$=2π·$R_1$. Additionally, the mark spacing (MS) 220 of the laser marks 216 is a factor when determining the circumference (e.g., the length) of a track because the mark spacing (MS) 220 will establish the integer number of the marks corresponding to the length of the track (e.g., the cumulative length of the marks 216 in the track) when determining a track length that is an integer number of marks.

A factor (k) is defined that equals a ceiling of the inner circumference (IC) divided by the mark spacing (MS) such that k=ceil(IC/MS), where a ceiling of any number N rounds N up to the next nearest integer. Substitute for the inner circumference (IC=2π·R) and k=ceil(2π·IR/MS) which is the number of mark spacings along the inner circumference, rounded up to the next nearest integer.

To achieve an integral number of mark spacings on the first track 214(1), the first track radius $R_1$ is determined such that the circumference $C_1$ of the first track has k mark spacings. Then $C_1$=k·MS=ceil(2π·IR/MS)·MS and $R_1$=$C_1$/2π=ceil(2π·IR/MS)/(2π/MS). The inner radius (IR) is subtracted from the equation such that $R_1$−IR=ceil(2π·IR/MS)/(2π/MS)=[ceil(IR·(2π/MS))−IR·(2π/MS)]/(2π/MS). The resulting equation for the first track radius is bounded by 0<=|$R_1$−IR|<MS/(2π). Therefore, the adjustment in starting track radius from IR to $R_1$ to achieve a circumference that is an integer number of mark spacings in length is less than a sixth of the mark spacing.

Following is a computational summary for determining the radius of the first track as described above:

IR inner radial limit
OR outer radial limit
IC inner circumference
OC outer circumference
$R_1$ first track radius
$C_1$ circumference of the first track
MS mark spacing
k a constant factor
ceil( ) ceiling(N) rounds N up to the next nearest integer $$IC = 2\pi \cdot IR$$

$$OC = 2\pi \cdot OR$$

$$C_1 = 2\pi \cdot R_1$$

$$k = \text{ceil}(IC/MS)$$

substituting for IC, $$k = \text{ceil}(2\pi \cdot IR/MS)$$

defining $C_1$=k·MS, $$R_1 = k \cdot MS / 2\pi$$

$$R_1 = \frac{\text{ceil}(2\pi \cdot IR/MS)}{(2\pi/MS)}$$

subtracting IR, $$R_1 - IR = \frac{\text{ceil}(IR \cdot (2\pi/MS))}{(2\pi/MS)} - IR$$

$$R_1 - IR = \frac{\text{ceil}(IR \cdot (2\pi/MS)) - IR \cdot (2\pi/MS)}{(2\pi/MS)}$$

which is bounded by, 0<=|$R_1$−IR|<MS/(2π)<MS/6.

Accordingly, the first track radius ($R_1$) is determined such that the circumferential length of the first track 214(1) is an integer number of mark spaces 220 in length. After the first track radius ($R_1$) is determined, an adjusted track spacing (ATS) is determined such that the track circumferences ($C_n$) of the subsequent concentric circular tracks 214(2), 214(3), ..., 214(N), ..., 214(N+M) are also an integer number of marks, or mark spaces, in a respective track.

A nominal track spacing (NTS) can be selected such that a nominal track-to-mark spacing ratio (NSR) results in a uniform mark density when the label image is written onto the disc media 202. The nominal track-to-mark spacing ratio (NSR) is calculated based on the nominal track spacing (NTS) and the mark spacing (MS) such that the nominal spacing ratio NSR=NTS/MS. For a given nominal spacing ratio (NSR), the circumference ($C_n$) of any track n is determined by $C_n$=2π·($R_1$+(n−1)·SR·MS), where n=1 for the first track 214(1) and n=2, 3, ..., N for the subsequent tracks 214(2), 214(3), ..., 214(N), respectively.

In the equation $C_n$=2π·($R_1$+(n−1)·SR·MS), substitute for $C_1$=2π·$R_1$ such that $C_n$=$C_1$+2π·(n−1)·SR·MS. Further, substitute for the nominal track spacing (NTS) which is the product of the nominal spacing ratio (NSR) and the mark spacing (MS) such that $C_n$=$C_1$+2π·(n−1)·NTS.

The circumference ($C_1$) of the first track 214(1) is an integer number of mark spacings in length. However, the subsequent track circumferences ($C_n$) will typically not be an integer number of mark spacings in length if based on the nominal track spacing (NTS). To enforce this constraint and ensure an integer number of mark spacings for each of the subsequent tracks 214(2), 214(3), ..., 214(N), an adjusted track spacing (ATS) is substituted for the nominal track spacing (NTS).

The adjusted track spacing (ATS) is determined such that the subsequent track circumferences ($C_n$) each increase by an integral multiple of mark spacings (MS) over a previous track circumference. For the second track 214(2), the circumference $C_2$=2π·($R_1$+ATS)=$C_1$+2π·ATS.

The increase in track circumference $C_2$−$C_1$=2π·ATS. The difference $C_2$−$C_1$ can be expressed as a multiple t of the mark spacing MS such that the adjusted track spacing ATS=(MS·t)/2π. Changing the track spacing from the nominal track spacing (NTS) value to the adjusted track spacing (ATS) value can change the resulting print density profile of the printed image (e.g., the label rendered on the disc media). However, the mark spacing multiple t can be selected to mitigate any resulting visual effect such that the difference between the adjusted track spacing and the nominal track spacing is minimized (e.g., |ATS−NTS|). Further, the multiple t can be selected to avoid overlapping tracks such that the adjusted track spacing (ATS) is not less than the nominal track spacing (NTS).

The equation for the adjusted track spacing ATS=(MS·t)/2π can be rewritten as ATS−NTS=(MS·t)/2π−NSR·MS when subtracting the nominal track spacing (NTS=NSR·MS) from the equation. The equation can then be rewritten as ATS−NTS=[(t/2π)−NSR]·MS which is equivalent to (ASR−NSR)·MS when substituting the adjusted track-to-mark spacing ratio ASR=t/2π. Example values of the multiple t and of the adjusted track-to-mark spacing ratio (ASR) are:

| t | ASR = | Approximate Value |
|---|---|---|
| 1 | 1/2π | 0.159 |
| 2 | 2/2π | 0.318 |
| 3 | 3/2π | 0.477 |
| 4 | 4/2π | 0.637 |
| 5 | 5/2π | 0.796 |
| 6 | 6/2π | 0.955 |
| 7 | 7/2π | 1.114 |

By selecting an adjusted track-to-mark spacing ratio (ASR) that is close to the nominal spacing ratio (NSR), the visual impact of changing the print density profile of the rendered label image is reduced. For example, if a particular ellipsoidal laser mark suggests a nominal track-to-pixel spacing ratio NSR=NTS/MS=(1/1000)/(1/600)=0.6, the closest adjusted spacing ratio (ASR) not less than the nominal spacing ratio (NSR=0.6) would be ASR=4/2π≈0.637. The adjusted track spacing (ATS), as determined by ATS=ASR·MS, is ATS=0.637·(1/600) which is approximately 0.00106, compared to the nominal track spacing of 0.001. Thus, for a track spacing of 0.00106, four laser mark spaces would be added to the length of the circumference for each subsequent track 214 when progressing in a radial direction 218 from the first track 214(1) to the outer radial limit (OR) 218.

Following is a computational summary for determining the adjusted track spacing (ATS) such that the subsequent track circumferences are also an integer number of mark spaces in length, as described above:

NTS nominal track spacing
ATS adjusted track spacing
NSR nominal track-to-mark spacing ratio=NTS/MS
ASR adjusted track-to-mark spacing ratio=ATS/MS
The adjusted circumference of the n-th track is $$C_n = C_1 + 2\pi \cdot (n-1) \cdot ATS$$

for the second track circumference, $$C_2 = C_1 + 2\pi \cdot ATS$$

$$C_2 - C_1 = 2\pi \cdot ATS$$

this difference is a multiple MS·t such that the adjusted track spacing, $$ATS = (MS \cdot t)/2\pi$$

ATS=ASR·MS according to the adjusted spacing ratio ASR=t/2π that is the closest match to the nominal spacing ratio NSR.

Figure 3:
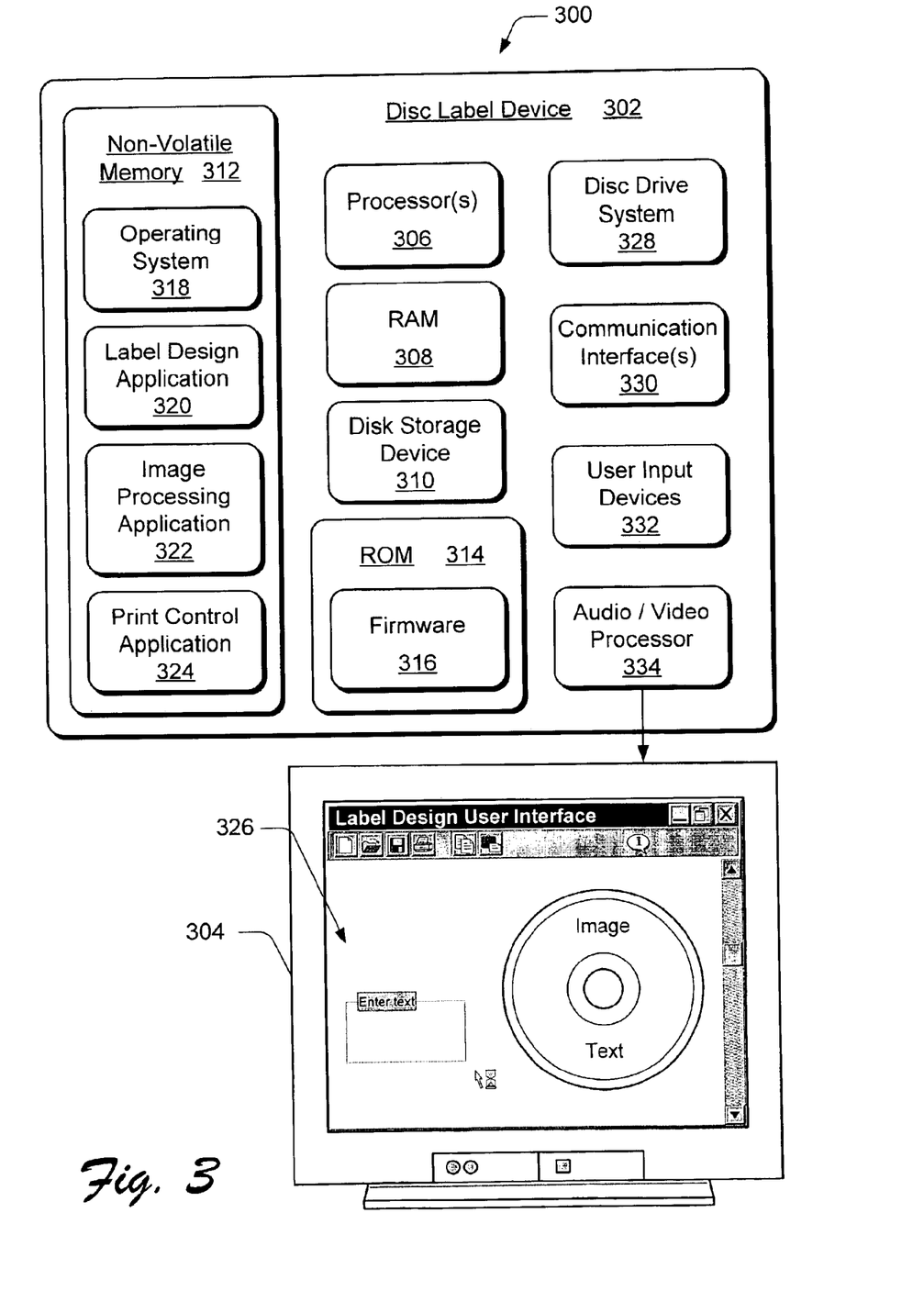
FIG. 3 illustrates an exemplary disc media marking system.

FIG. 3 illustrates an exemplary disc media marking system 300 that includes a disc media marking device 302 and a display device 304. The disc media marking device 302 can be implemented as a stand-alone, appliance device for disc media labeling as described above with reference to FIG. 2. Alternatively, the disc media marking device 302 can be integrated as part of an optical media player or drive, such as a writable compact disc (CD) player that is implemented to label an optical disc as well as record data onto a CD-R (CD-recordable disc) and/or a CD-RW (CD-rewritable disc). Such writable CD devices may include, for example, a stand-alone audio CD player that is a peripheral component in an audio system, a CD-ROM drive integrated as standard equipment in a PC (personal computer), a DVD (digital versatile disc) player, and any number of similar embodiments.

Disc media marking device 302 includes one or more processors 306 (e.g., any of microprocessors, controllers, and the like) which process various instructions to control the operation of disc media marking device 302 and to communicate with other electronic and computing devices. Disc media marking device 302 can be implemented with one or more memory components, examples of which include a random access memory (RAM) 308, a disk storage device 310, and non-volatile memory 312 (e.g., any one or more of a read-only memory (ROM) 314, flash memory, EPROM, EEPROM, etc.).

Disk storage device 310 can include any type of magnetic or optical storage device, such as a hard disk drive, a magnetic tape, a recordable and/or rewriteable compact disc (CD), a DVD, DVD+RW, and the like. The one or more memory components provide data storage mechanisms to store various information and/or data such as configuration information for disc media marking device 302, graphical user interface information, and any other types of information and data related to operational aspects of disc media marking device 302. Alternative implementations of disc media marking device 302 can include a range of processing and memory capabilities, and may include any number of differing memory components than those illustrated in FIG. 3.

Disc media marking device 302 includes a firmware component 316 that is implemented as a permanent memory module stored on ROM 314, or with other components in disc media marking device 302, such as a component of a processor 306. Firmware 316 is programmed and distributed with disc media marking device 302 to coordinate operations of the hardware within disc media marking device 302 and contains programming constructs used to perform such operations.

An operating system 318 and one or more application programs can be stored in non-volatile memory 312 and executed on processor(s) 306 to provide a runtime environment. A runtime environment facilitates extensibility of disc media marking device 302 by allowing various interfaces to be defined that, in turn, allow the application programs to interact with disc media marking device 302. In this example, the application programs include a label design application 320, an image processing application 322, and a print control application 324.

The label design application 320 generates a label design user interface 326 for display on display device 304 from which a user can create a label image to be rendered on a disc media, such as on an optical disc. A user can specify, or otherwise drag-and-drop text, a bitmap image for background, a digital photo, a graphic or symbol, and/or any combination thereof to create the label image on the user interface 326.

The image processing application 322 processes the label image created with the label design user interface 326 to produce a data stream of label image data and laser control data to control rendering the image on the concentric circular tracks of a disc media, such as disc media 202 (FIG. 2). For example, a continuous tone RGB (red, green, and blue) rectangular raster graphic of the label image can be converted to the concentric circular tracks. The curved raster is color mapped and separated into the printing color channels KCMY (black, cyan, magenta, and yellow), and the continuous channel tones are replaced by discrete (e.g. binary) values representing the possible printing levels of the system. This data stream is formatted as laser control data and is augmented with other control commands to control the disc media marking device 302 rendering a label on the disc media. A label file is generated that can be communicated to a controller where the label file is parsed to control a labeling mechanism. Alternatively, the concentric circular tracks may be generated and streamed to the disc media marking device 302 one track at a time to utilize host processing with the device's rendering process.

The print control application 324 determines the radius of the first track and determines the subsequent track spacing as described above in the exemplary implementation of disc media marking 200 (FIG. 2). After the radius of the first track and the track spacing is determined, the print control application 324 determines which label image data will correspond to each respective track. The laser mark locations along a particular track are specified in a coordinate system where the concentric circular tracks are defined in coordinates of the radial distance and the distance along each respective track.

Disc media marking device 302 includes a disc drive system 328 that can be implemented to mark on a surface of a disc media, such as to render a label image on a label side (e.g., the non-data side) of disc media 202 (FIG. 2). The disc drive system 328 is further described below with reference to FIG. 4.

Disc media marking device 302 further includes one or more communication interfaces 330 which can be implemented as any one or more of a serial and/or parallel interface, as a wireless interface, any type of network interface, and as any other type of communication interface. A wireless interface enables disc media marking device 302 to receive control input commands and other information from an input device, such as from a remote control device or from another infrared (IR), 802.11, Bluetooth, or similar RF input device. A network interface provides a connection between disc media marking device 302 and a data communication network which allows other electronic and computing devices coupled to a common data communication network to send label image data and other information to disc media marking device 302 via the network. Similarly, a serial and/or parallel interface provides a data communication path directly between disc media marking device 302 and another electronic or computing device.

Disc media marking device 302 may include user input devices 332 that can include a keyboard, pointing device, selectable controls on a user control panel, and/or other mechanisms to interact with, and to input information to disc media marking device 302. Disc media marking device 302 also includes an audio/video processor 334 that generates display content for display on display device 304, and generates audio content for presentation by a presentation device, such as one or more speakers (not shown). The audio/video processor 334 can include a display controller that processes the display content to display corresponding images on display device 304. A display controller can be implemented as a graphics processor, microcontroller, integrated circuit, and/or similar video processing component to process the images. Video signals and audio signals can be communicated from disc media marking device 302 to display device 304 via an RF (radio frequency) link, S-video link, composite video link, component video link, or other similar communication link.

Although shown separately, some of the components of disc media mark ing device 302 may be implemented in an application specific integrated circuit (ASIC). Additionally, a system bus (not shown) typically connects the various components within disc media marking device 302. A system bus can be implemented as one or more of any of several types of bus structures, including a memory bus or memory controller, a peripheral bus, an accelerated graphics port, or a local bus using any of a variety of bus architectures. Further, disc media marking device 302 may share a system bus with a host processor.

Figure 4:
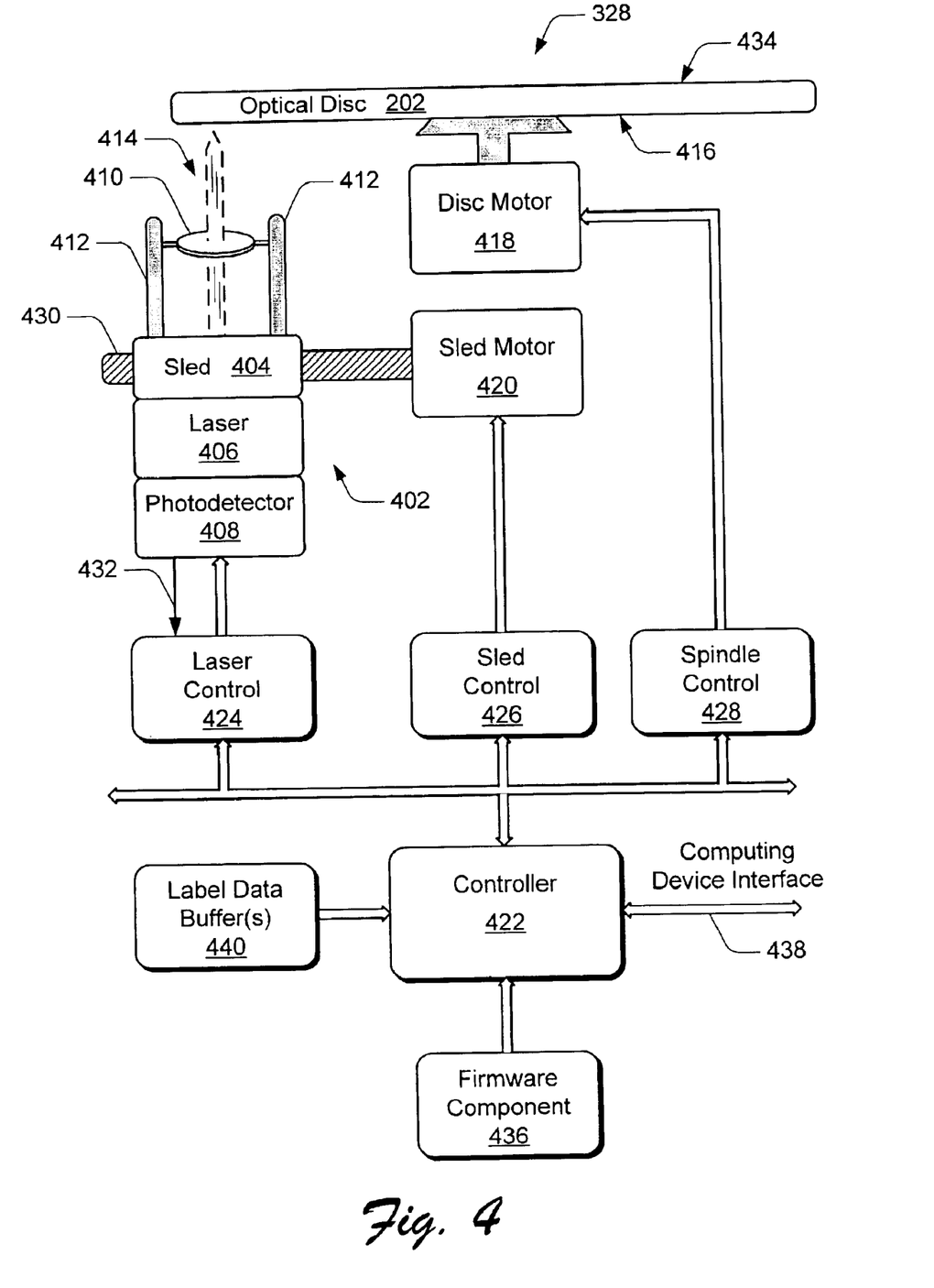
FIG. 4 further illustrates various components of the disc media marking system shown in FIG. 3.

FIG. 4 illustrates an exemplary implementation of the disc drive system 328 which is shown as a component of the exemplary disc media marking device 302 in FIG. 3. The disc drive system 328 has a laser assembly 402 that includes a sled 404 which supports a laser 406, a photodetector 408, a laser focusing lens 410, and lens supports 412.

A laser beam 414 is generated by the laser 406 and focused onto a label surface 416 of disc media 202. The laser beam 414 creates laser marks that correspond to label image data to render an image of the label on the disc media 202 as described above with reference to the exemplary implementation of disc media marking 200 (FIG. 2).

The disc drive system 328 includes a disc motor 418, a sled motor 420, and a controller 422. The controller 422 processes operating instructions for a laser control 424, a sled control 426, and a spindle control 428. The spindle control 428 drives the disc motor 418 to control a rotational speed of disc 202 and operates in conjunction with the sled control 426 which drives the sled motor 420 to control the radial position of laser assembly 402 with respect to disc 202 along a sled drive mechanism 430. In one implementation, the rotational speed of disc 202 and the radial position of laser assembly 402 are controlled such that the laser marks are written on the disc 202 as a particular track moves over the laser beam 414 at a constant linear velocity.

The laser control 424 controls the firing of laser beam 414 to write the laser marks which correspond to the label image onto disc media 202. Photodetector 408 can be implemented as an optical pickup unit that provides laser focus feedback 432 to the laser control 424. Additionally, the laser control 424 controls the intensity of the laser beam 414 to read data maintained on the data side 434 of the disc media 202 when the disc is positioned such that the data side 434 passes over the laser beam 414. The laser control 424, sled control 426, and spindle control 428 can be implemented as component drivers and can be maintained as computer-executable instructions with a firmware memory component 436. Additionally, the component drivers can be executed on the one or more processors 306 (FIG. 3) of the disc label device 302.

Computing device interface 438 interfaces the controller 422 of the disc drive system 328 with another electronic or computing device to receive label image data or a label file, for example, that can be maintained with one or more label data buffer(s) 440. The computing device interface 438 can be implemented as an ATAPI (Advanced Technology Attachment Packet Interface), which is one of many small computer parallel or serial device interfaces. Another common computer interface is SCSI (small computer system interface), which is a generalized device interface for attaching peripheral devices to computers. SCSI defines the structure of commands, the way commands are executed, and the way status is processed. Various other physical interfaces include the Parallel Interface, Fiber Channel, IEEE 1394, USB (Universal Serial Bus), and ATA/ATAPI. ATAPI is a command execution protocol for use on an ATA interface so that CD-ROM and tape drives can be connected via the same ATA cable with an ATA hard disk drive. ATAPI devices generally include CD-ROM drives, CD-recordable drives, CD-rewritable drives, DVD (digital versatile disc) drives, tape drives, super-floppy drives (e.g., ZIP and LS-120), and the like.

Methods for disc media marking may be described in the general context of computer-executable instructions. Generally, computer-executable instructions include routines, programs, objects, components, data structures, procedures, and the like that perform particular functions or implement particular abstract data types. Methods for disc media marking may also be practiced in distributed computing environments where functions are performed by remote processing devices that are linked through a communications network. In a distributed computing environment, computer-executable instructions may be located in both local and remote computer storage media, including memory storage devices.

Figure 5:
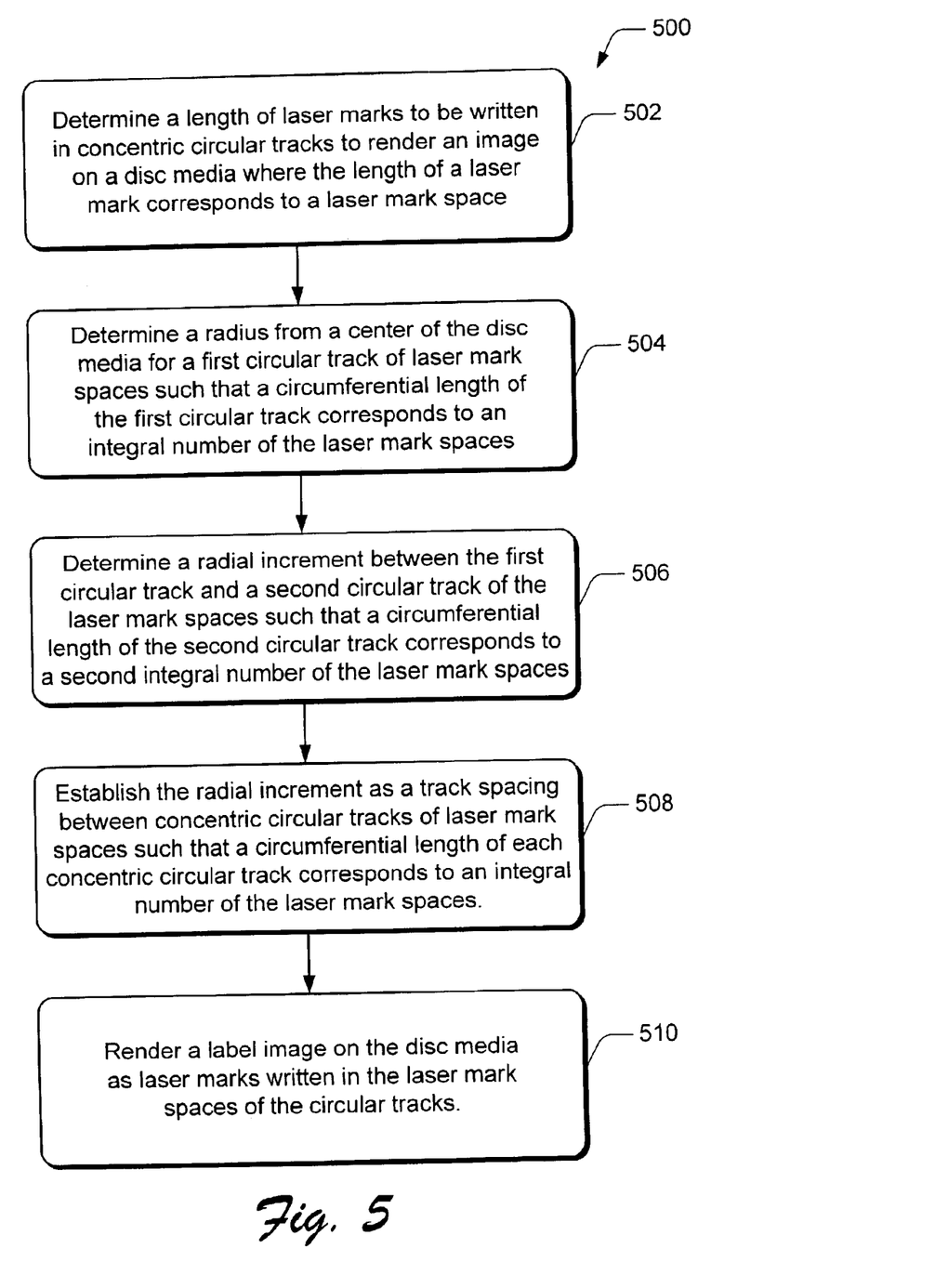
FIG. 5 is a flow diagram that illustrates an exemplary method for disc media marking.

FIG. 5 illustrates a method 500 for disc media marking. The order in which the method is described is not intended to be construed as a limitation, and any number of the described method blocks can be combined in any order to implement the method. Furthermore, the method can be implemented in any suitable hardware, software, firmware, or combination thereof.

At block 502, a length of laser marks to be written in concentric circular tracks to render an image on a disc media is determined where the length of a laser mark corresponds to a laser mark space. For example, print control application 324 of the disc media marking device 302 (FIG. 3) determines a length of laser marks 216 (FIG. 2). The length of a laser mark 216 corresponds to a laser mark space 220.

At block 504, a radius from a center of the disc media for a first circular track of laser mark spaces is determined such that a circumferential length of the first circular track corresponds to an integral number of the laser mark spaces. For example, the print control application 324 (FIG. 3) determines a radius 218 (FIG. 2) from a center of the disc media 202 for a first circular track 214(1) such that the circumferential length of the first circular track 214(1) corresponds to an integral number of the laser mark spaces 220. The radius of the first circular track 214(1) is determined to be greater than or equal to a radius 210 of an inner label region boundary 206. Alternatively, if the first circular track is designated as the outer-most track 214(N+M), then the radius of the first circular track 214(N+M) is determined to be less than or equal to a radius 212 of an outer label region boundary 208.

At block 506, a radial increment between the first circular track and a second circular track of the laser mark spaces is determined such that a circumferential length of the second circular track corresponds to a second integral number of the laser mark spaces. For example, the print control application 324 (FIG. 3) determines the radial increment between the first circular track 214(1) (FIG. 2) and a second circular track 214(2) such that a circumferential length of the second circular track 214(2) corresponds to a second integral number of the laser mark spaces 220.

At block 508, the radial increment is established as a track spacing between concentric circular tracks of laser mark spaces such that a circumferential length of each concentric circular track corresponds to an integral number of the laser mark spaces. For example, the print control application 324 (FIG. 3) establishes the radial increment (e.g., along radius 218 (FIG. 2)) between the first circular track 214(1) and the second circular track 214(2) as the track spacing distance between all of the concentric circular tracks 214 such that the circumferential length of each concentric circular track corresponds to an integral number of the laser mark spaces 220.

At block 510, a label image is rendered on the disc media as laser marks written in the laser mark spaces of the circular tracks. For example, the disc drive system 328 (FIG. 4) renders an image in the label region 204 (FIG. 2) on disc media 202 as laser marks 216 in the concentric circular tracks 214.

Figure 6:
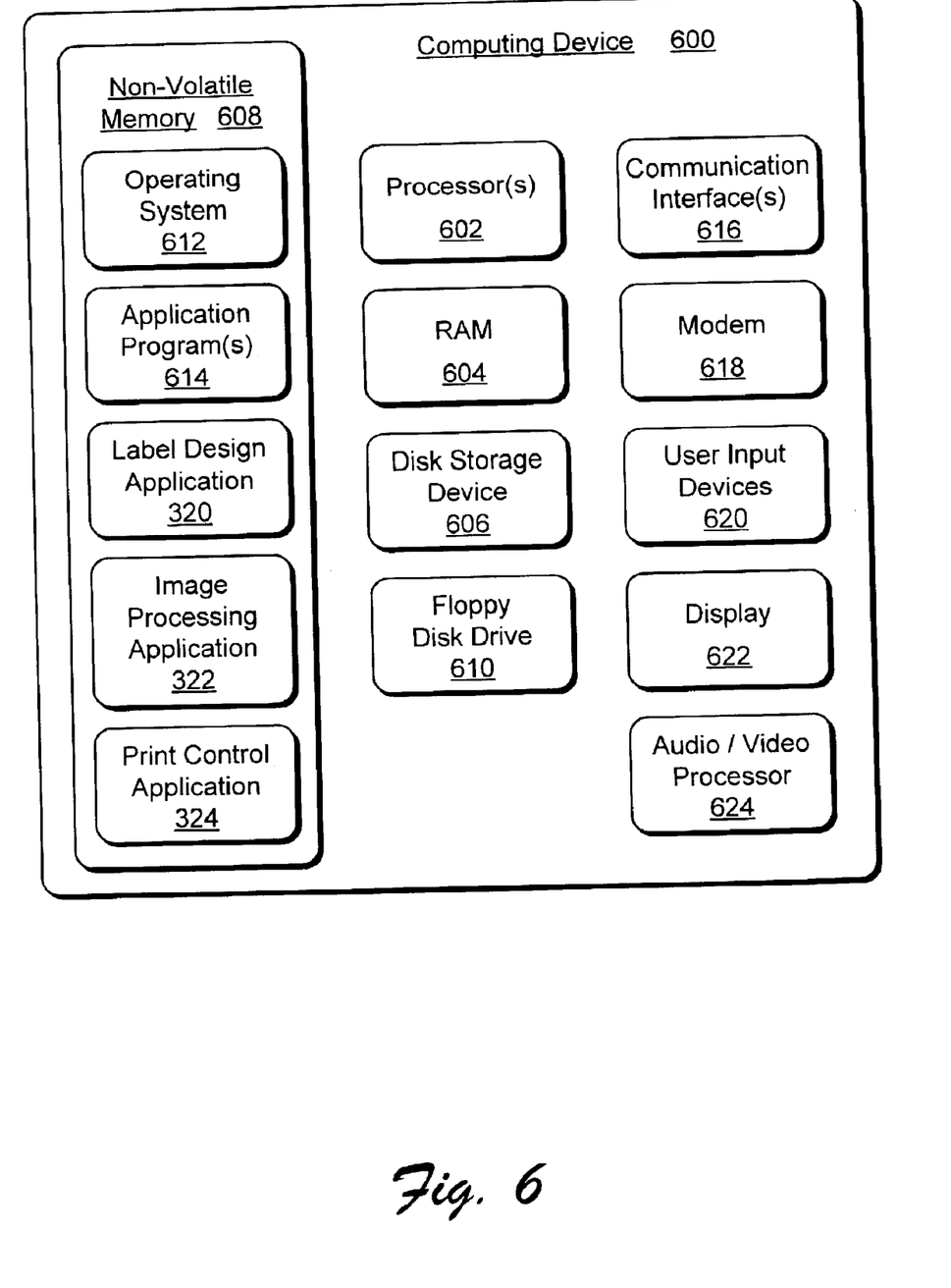
FIG. 6 illustrates various components of an exemplary computing device that can be implemented with a disc media marking system.

FIG. 6 illustrates an exemplary computing device 600 that can be implemented as a component of a disc media marking system, such as the exemplary disc media marking system 300 shown in FIG. 3. Computing device 600 includes one or more processors 602 (e.g., any of microprocessors, controllers, and the like) which process various instructions to control the operation of computing device 600 and to communicate with other electronic and computing devices. Computing device 600 can be implemented with one or more memory components, examples of which include a random access memory (RAM) 604, a disk storage device 606, non-volatile memory 608 (e.g., any one or more of a read-only memory (ROM), flash memory, EPROM, EEPROM, etc.), and a floppy disk drive 610.

Disk storage device 606 can include any type of magnetic or optical storage device, such as a hard disk drive, a magnetic tape, a recordable and/or rewriteable compact disc (CD), a DVD, DVD+RW, and the like. The one or more memory components provide data storage mechanisms to store various information and/or data such as configuration information for computing device 600, graphical user interface information, and any other types of information and data related to operational aspects of computing device 600. Alternative implementations of computing device 600 can include a range of processing and memory capabilities, and may include any number of differing memory components than those illustrated in FIG. 6.

An operating system 612 and one or more application program(s) 614 can be stored in non-volatile memory 608 and executed on processor(s) 602 to provide a runtime environment. A runtime environment facilitates extensibility of computing device 600 by allowing various interfaces to be defined that, in turn, allow the application programs 614 to interact with computing device 600. The application programs 614 can include a browser to browse the Web (e.g., "World Wide Web"), an email program to facilitate electronic mail, and any number of other application programs. The label design application 320, image processing application 322, and print control application 324, as described above with reference to the disc media marking device 302 (FIG. 3), can also be stored in non-volatile memory 608 and executed on processor(s) 602 in computing device 600.

Computing device 600 further includes one or more communication interfaces 616 and a modem 618. The communication interfaces 616 can be implemented as any one or more of a serial and/or parallel interface, as a wireless interface, any type of network interface, and as any other type of communication interface. A wireless interface enables computing device 600 to receive control input commands and other information from an input device, such as from a remote control device or from another infrared (IR), 802.11, Bluetooth, or similar RF input device.

A network interface provides a connection between computing device 600 and a data communication network which allows other electronic and computing devices coupled to a common data communication network to communicate information to computing device 600 via the network. For example, computing device 600 can communicate label image data or a label file to the disc media marking system 300 (FIG. 3). Similarly, a serial and/or parallel interface provides a data communication path directly between computing device 600 and another electronic or computing device. Modem 618 facilitates computing device 600 communication with other electronic and computing devices via a conventional telephone line, a DSL connection, cable, and/or other type of connection.

Computing device 600 may include user input devices 620 that can include a keyboard, mouse, pointing device, and/or other mechanisms to interact with, and to input information to computing device 600. Computing device 600 also may include an integrated display device 622, such as for a potable computing device and similar mobile computing devices.

Computing device 600 also includes an audio/video processor 624 that generates display content for display on the display device 622, and generates audio content for presentation by a presentation device, such as one or more speakers (not shown). The audio/video processor 624 can include a display controller that processes the display content to display corresponding images on the display device 622. A display controller can be implemented as a graphics processor, microcontroller, integrated circuit, and/or similar video processing component to process the images. Video signals and audio signals can be communicated from computing device 600 to an external display device (e.g., display device 304 FIG. 3) via an RF (radio frequency) link, S-video link, composite video link, component video link, or other similar communication link.

Although shown separately, some of the components of computing device 600 may be implemented in an application specific integrated circuit (ASIC). Additionally, a system bus (not shown) typically connects the various components within computing device 600. A system bus can be implemented as one or more of any of several types of bus structures, including a memory bus or memory controller, a peripheral bus, an accelerated graphics port, or a local bus using any of a variety of bus architectures.

Although the invention has been described in language specific to structural features and/or methods, it is to be understood that the invention defined in the appended claims is not necessarily limited to the specific features or methods described. Rather, the specific features and methods are disclosed as exemplary implementations of the claimed invention.

What is claimed is:

1. A disc marking system, comprising:
   a laser configured to render an image on a disc media as laser marks written in concentric circular tracks; and
   a print control application configured to determine a radius of a first circular track such that a circumferential length of the first circular track corresponds to an integral number of laser mark spaces, the print control application further configured to determine a radial increment from the first circular track to a second circular track such that a circumferential length of the second circular track corresponds to a second integral number of the laser mark spaces.

2. A disc label system as recited in claim 1, wherein the print control application determines the radial increment to be a radial distance between concentric circular tracks of the laser mark spaces such that a circumferential length of each concentric circular track corresponds to an integral number of the laser mark spaces, and wherein the concentric circular tracks include the first circular track and the second circular track.

3. A disc label system as recited in claim 1, wherein the print control application determines the radius of the first circular track to be at least one of equal to or greater than a radius of an inner label region boundary on the disc media.

4. A disc label system as recited in claim 1, wherein the print control application determines the radius of the first circular track to be at least one of equal to or less than a radius of an outer label region boundary on the disc media.

5. A disc label system as recited in claim 1, wherein the print control application determines the radius of the first circular track by an equation X/Y, where:
   X is a ceiling of a product of a radius of an inner label region boundary and two times pi divided by a length of a mark space; and
   Y is two times pi divided by the length of a mark space.

6. A disc label system as recited in claim 1, wherein the print control application determines the radial increment to be a product of a length of a mark space and a factor divided by two times pi, and wherein the factor is a positive integer.

7. A disc media marking appliance device comprising the disc marking system as recited in claim 1.

8. An optical disc read-write device comprising the disc marking system as recited in claim 1.

9. A disc marking system configured to determine a radius of a circular track of laser mark spaces such that a circumferential length of the circular track corresponds to an integral number of the laser mark spaces.

10. A disc marking system as recited in claim 9 further configured to determine a radial increment between concentric circular tracks of the laser mark spaces such that a circumferential length of each concentric circular track corresponds to an integral number of the laser mark spaces.

11. A disc marking system configured to determine a radial increment between concentric circular tracks of laser mark spaces such that a circumferential length of each concentric circular track corresponds to an integral number of the laser mark spaces.

12. A disc marking system as recited in claim 11 further configured to determine a radius from a center of a disc for a first one of the concentric circular tracks of laser mark spaces such that a circumferential length of the first concentric circular track corresponds to an integral number of the laser mark spaces.

13. A method, comprising:
   determining a radius from a center of a disc media for a first circular track of laser mark spaces such that a circumferential length of the first circular track corresponds to an integral number of the laser mark spaces; and
   determining a radial increment between the first circular track and a second circular track of the laser mark spaces such that a circumferential length of the second circular track corresponds to a second integral number of the laser mark spaces.

14. A method as recited in claim 13, further comprising rendering a label image on the disc media as laser marks written in the laser mark spaces of the circular tracks.

15. A method as recited in claim 13, further comprising establishing the radial increment as a track spacing between concentric circular tracks of laser mark spaces such that a circumferential length of each concentric circular track corresponds to an integral number of the laser mark spaces, and wherein the concentric circular tracks includes the first circular track and the second circular track.

16. A method as recited in claim 13, wherein determining the radial increment includes determining the radial increment to be a radial distance between concentric circular tracks of the laser mark spaces such that a circumferential length of each concentric circular track corresponds to an integral number of the laser mark spaces.

17. A method as recited in claim 13, wherein determining the radius includes determining the radius of the first circular track to be at least one of equal to or greater than a radius of an inner label region boundary.

18. A method as recited in claim 13, wherein determining the radius includes determining the radius of the first circular track to be at least one of equal to or less than a radius of an outer label region boundary.

19. A method comprising:
   determining a length of laser marks to be written in concentric circular tracks to render an image on a disc media, the length of a laser mark corresponding to a laser mark space; and
   determining a radius of a first one of the concentric circular tracks such that a circumferential length of the first circular track corresponds to an integral number of laser mark spaces.

20. A method as recited in claim 19, further comprising determining a radial increment between the concentric circular tracks such that a circumferential length of each concentric circular track corresponds to an integral number of the laser mark spaces.

21. A method as recited in claim 19, wherein determining the radius of the first circular track includes determining the radius to be at least one of equal to or greater than a radius of an inner label region boundary on the disc media.

22. A method as recited in claim 19, wherein determining the radius of the first circular track includes determining the radius to be at least one of equal to or less than a radius of an outer label region boundary on the disc media.

23. A method comprising:
   determining a length of laser marks to be written in concentric circular tracks to render an image on a disc media, the length of a laser mark corresponding to a laser mark space; and
   determining a radial increment between concentric circular tracks of laser mark spaces such that a circumferential length of each concentric circular track corresponds to an integral number of the laser mark spaces.

24. A method as recited in claim 23, further comprising determining a radius from a center of the disc media for a first one of the concentric circular tracks such that a circumferential length of the first circular track corresponds to an integral number of the laser mark spaces.

25. A method as recited in claim 23, further comprising determining a radius from a center of the disc media for a first one of the concentric circular tracks such that a circumferential length of the first circular track corresponds to an integral number of the laser mark spaces, and such that the radius is at least one of equal to or greater than a radius of an inner label region boundary on the disc media.

26. A method as recited in claim 23, further comprising determining a radius from a center of the disc media for a first one of the concentric circular tracks such that a circumferential length of the first circular track corresponds to an integral number of the laser mark spaces, and such that the radius is at least one of equal to or less than a radius of an outer label region boundary on the disc media.

27. A disc marking system, comprising:
   means to determine a length of laser marks to be written in concentric circular tracks to render an image on a disc media, the length of a laser mark corresponding to a laser mark space; and
   means to determine a radius of a first one of the concentric circular tracks such that a circumferential length of the first circular track corresponds to an integral number of laser mark spaces.

28. A disc marking system as recited in claim 27, further comprising means to determine a radial increment between the concentric circular tracks such that a circumferential length of each concentric circular track corresponds to an integral number of the laser mark spaces.

29. A disc marking system, comprising:
   means to determine a length of laser marks to be written in concentric circular tracks to render an image on a disc media, the length of a laser mark corresponding to a laser mark space; and
   means to determine a radial increment between concentric circular tracks of laser mark spaces such that a circumferential length of each concentric circular track corresponds to an integral number of the laser mark spaces.

30. A disc marking system as recited in claim 29, further comprising means to determine a radius from a center of the disc media for a first one of the concentric circular tracks such that a circumferential length of the first circular track corresponds to an integral number of the laser mark spaces.

31. A storage media, comprising:
   a data side configured to maintain data written onto the storage media;
   a label side having an image region configured as concentric circular tracks of laser mark spaces such that laser marks can be written in the laser mark spaces to render an image on the storage media;
   a first circular track having a radius such that a circumferential length of the first circular track corresponds to an integral number of the laser mark spaces; and
   a second circular track spaced a radial increment from the first circular track such that a circumferential length of the second circular track corresponds to a second integral number of the laser mark spaces.

32. A storage media as recited in claim 31, wherein the label side includes an inner image region boundary and an outer image region boundary, and wherein the radius of the first circular track is at least one of equal to or greater than a radius of the inner image region boundary.

33. A storage media as recited in claim 31, wherein the label side includes an inner image region boundary and an outer image region boundary, and wherein the radius of the first circular track is at least one of equal to or less than a radius of the outer image region boundary.

34. A storage media as recited in claim 31, wherein the radial increment between the first circular track and the second circular track is a radial distance between each of the concentric circular tracks such that a circumferential length of each concentric circular track corresponds to an integral number of the laser mark spaces.

35. One or more computer-readable media comprising computer executable instructions that, when executed, direct a disc media system to:
   determine a radius from a center of a disc media for a first circular track of laser mark spaces such that a circumferential length of the first circular track corresponds to an integral number of the laser mark spaces; and determine a radial increment between the first circular track and a second circular track of the laser mark spaces such that a circumferential length of the second circular track corresponds to a second integral number of the laser mark spaces.

36. One or more computer-readable media as recited in claim 35, further comprising computer executable instructions that, when executed, direct the disc media system to establish the radial increment as a track spacing between concentric circular tracks of laser mark spaces such that a circumferential length of each concentric circular track corresponds to an integral number of the laser mark spaces, and wherein the concentric circular tracks includes the first circular track and the second circular track.

* * * * *